MAGNETIC RECORD TRANSDUCING HEADS

Filed April 4, 1956 3 Sheets-Sheet 1

INVENTORS
HEIMAN W. KOREN
IGNATIUS MICHALKO
BY
Greene, Pineles & Durr
ATTORNEYS

Jan. 10, 1961 H. W. KOREN ET AL 2,967,750

MAGNETIC RECORD TRANSDUCING HEADS

Filed April 4, 1956 3 Sheets-Sheet 2

INVENTORS
HEIMAN W. KOREN
IGNATIUS MICHALKO

BY Greene, Pineles & Durr

ATTORNEYS

INVENTORS
HEIMAN W. KOREN
IGNATIUS MICHALKO
BY
Greene, Pineles & Durr
ATTORNEYS 2,967,750

MAGNETIC RECORD TRANSDUCING HEADS

Heiman W. Koren, Bronxville, and Ignatius Michalko, Ossining, N.Y., assignors to Sonotone Corporation, Elmsford, N.Y., a corporation of New York Filed Apr. 4, 1956, Ser. No. 575,990

5 Claims. (Cl. 346—74)

This invention relates to magnetic record transducing heads of the type which are used in magnetic recording systems for recording magnetic signals or reproducing magnetically recorded signals by magnetic flux interlinkage between the transducing windings of the magnetic head and a relatively wide, extended record track surface of a magnetic recording medium such as a tape or sheet during relative movement between such head and the recording medium.

Among the objects of the invention is a magnetic transducing head which permits efficient magnetic recording and/or reproducing of magnetic record signals with a magnetic record tape or like recording medium, and which lends itself to mass production with relatively uniform operating characteristics.

The foregoing and other objects of the invention will be best understood from the following description of exemplifications thereof, reference being had to the accompanying drawings, wherein.

Figures 1, 2, 3, 4, 5:
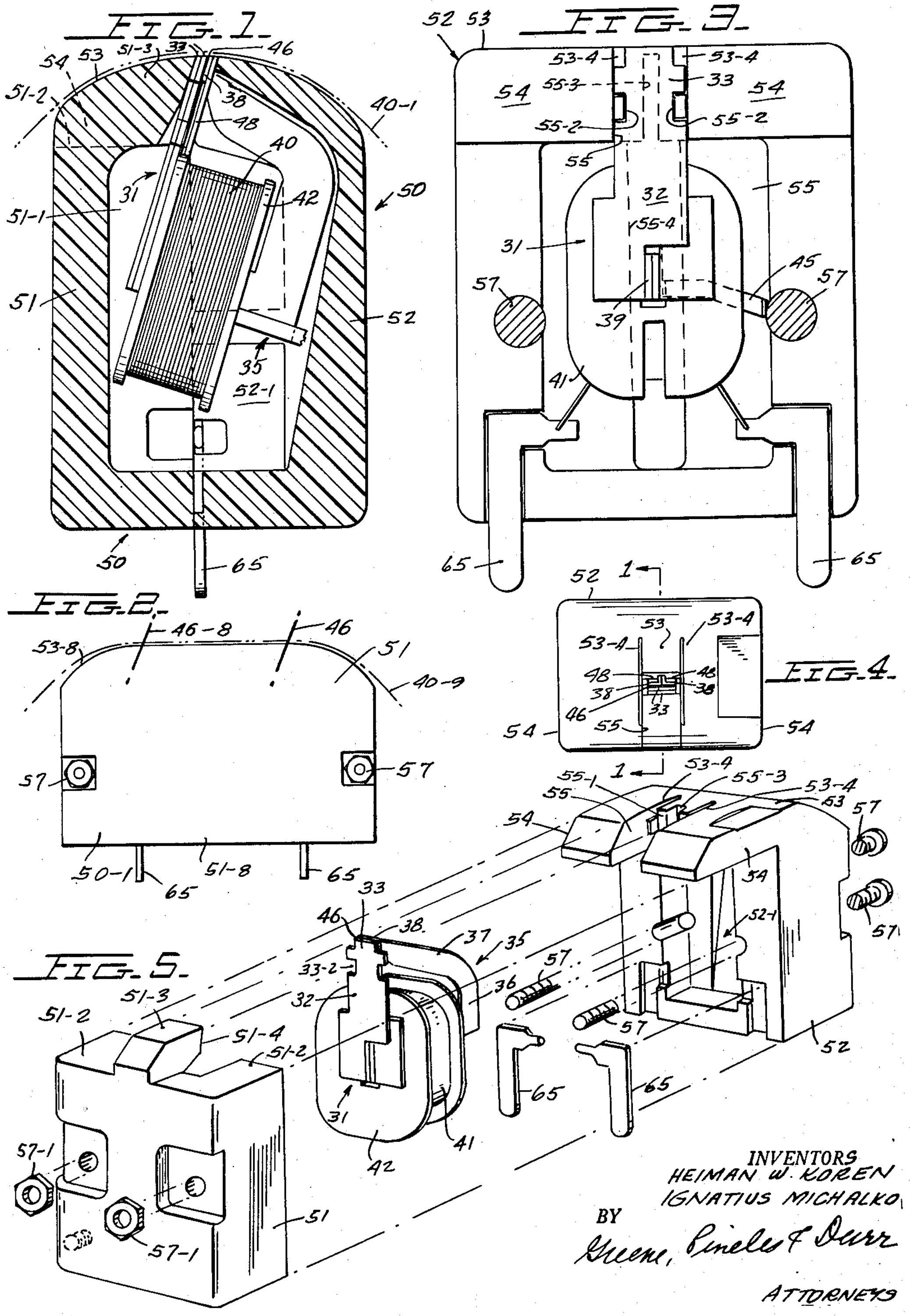
Fig. 1 is a greatly enlarged cross-sectional view along lines 1—1 of Fig. 4, of one form of a magnetic record transducing head exemplifying the invention.
Fig. 2 is an elevational view, seen from the same side as Fig. 1, of a similar head structure combining both a record-transducing head and a record-erasing head.
Fig. 3 is a side elevational view of the head of Fig. 1, as seen from the left side thereof, with the left side of the casing removed to expose the interior assembly.
Fig. 4 is a top view, on a smaller scale, of the head as seen in Fig. 3.
Fig. 5 is an exploded perspective view of the elements of the head of Figs. 1–3.
Figure 8:
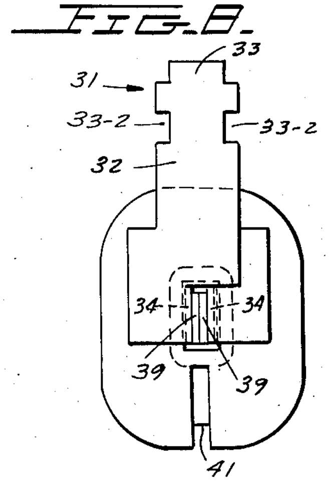
Figure 7:
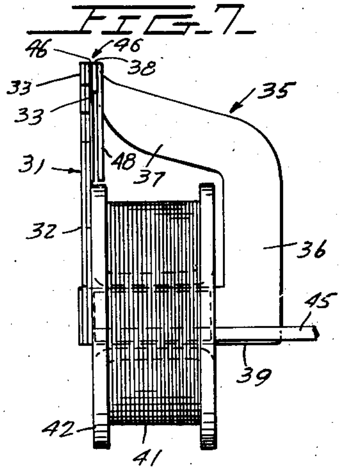
Fig. 7 is an elevational view similar to Fig. 1 of the internal core and coil assembly of the same head.
Figure 9:
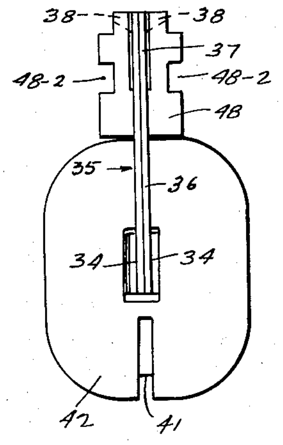
Figure 7A:
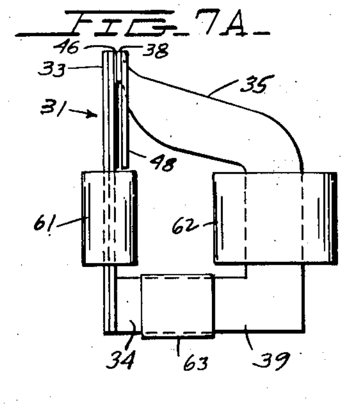
Figure 10:
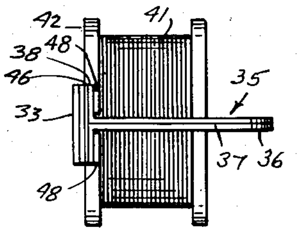
Figure 7B:
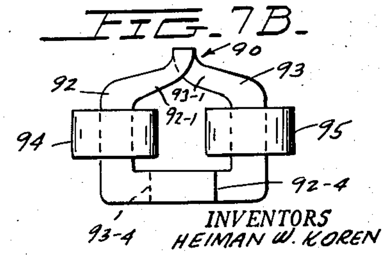
Figure 10F:
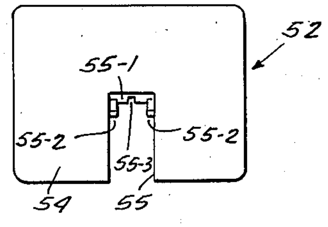
Figure 10G:
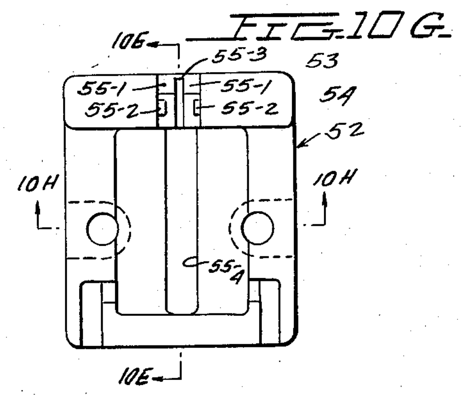
Figure 10H:
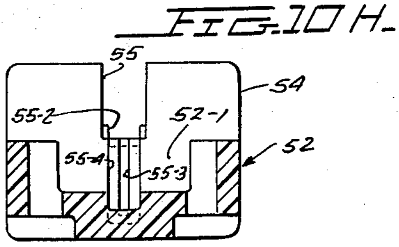

Fig. 7–A is a view similar to Fig. 7 of a modified form of a head of the invention;

Fig. 7–B is a view similar to Fig. 3 of another form of magnetic transducing head exemplifying the invention;

Fig. 8 is a side elevational view of the head assembly of Fig. 7 as seen from the left side thereof;

Fig. 9 is a side elevational view of the head assembly of Fig. 7 as seen from the right side thereof; and Fig. 10 is a top view of the head assembly of Fig. 7.

Although the magnetic heads of the invention described hereinafter have been evolved for use in recording or reproducing magnetically recorded signals, it should be noted that, essentially, the same head structure may also be used for erasing magnetically recorded signals, in which case the magnetic core structure thereof may be provided with a larger non-magnetic gap through which the windings of the head are magnetically interlinked with successive elements of the record track which is to be obliterated.

One form of magnetic record transducing head for magnetically recording and reproducing magnetic record signals in accordance with the principles of the invention, is shown in Figs. 1–10.

Referring to Figs. 1–10, the head comprises two complementary opposite core sections, generally designated 31 and 35, respectively, forming a loop-like, substantially closed magnetic circuit or core, except for a minute non-magnetic transducing gap represented by non-magnetic spacer shim 46 separating the pole faces of the core for transducing magnetic records on a relatively wide record track, such as a tape moving relatievly to or past the gap 46, the record track or tape being indicated by dash-double-dot line 40–1. The closed core loop is interlinked with transducer windings shown in the form of a coil 41 wound on a bobbin 42 and surrounding a portion of the core. The two core sections 31, 35 are shown formed of magnetizable sheet material of high magnetic permeability and a minimum of magnetic retentivity. Commercially available magnetic sheet materials such as those known under the trademarks "78 Permalloy," "High Mu 80," "Mumetal" and "16 Alphenol," which have high permeability and low retentivity, are suitable for forming the magnetic cores of such heads.

The core section 31 is formed of two complementary L-shaped magnetic sheet portions or laminations 32, each being a mirror image of the other. Each core lamination 32 has a coextensive overlapping outer pole arm 32 terminating into an end pole portion 33 and a coextensive overlapping inner arm 34 formed by bending the sheet portion thereof out of the plane of the pole arm 32 thereof in a direction transverse thereto. The other complementary core section 35 is formed of two complementary C-shaped magnetic sheet portions or laminations 36, each being a mirror image of the other. Each core lamination 36 has a coextensive overlapping outer pole arm 37 terminating into a pole portion 38 which is laterally bent from the plane of pole arm 37, and a coextensive overlapping inner core arm 39 extending into overlapping engagement with the inner core arms 34 of the laminations 32 of the other complementary core section 31. The two complementary core laminations 36 of core section 35 are so shaped that when they are assembled in overlapping side by side surface engagement with each other along their pole arms 37 and inner arms 39, their laterally bent pole ends 38 are aligned with each other and form a pole face aligned in a plane parallel to and opposite to the plane of the sheet surfaces of the overlapping pole end portion 33 of the laminations 32 of the opposite core section 31, so as to form therewith opposite pole faces bounding the minute non-magnetic transducing gap 46 through which the record transducing flux passing through the two core sections 31, 35 is interlinked with a relatively moving portion of the record track 40–1 bridging the transducing gap 46.

Figure 6:
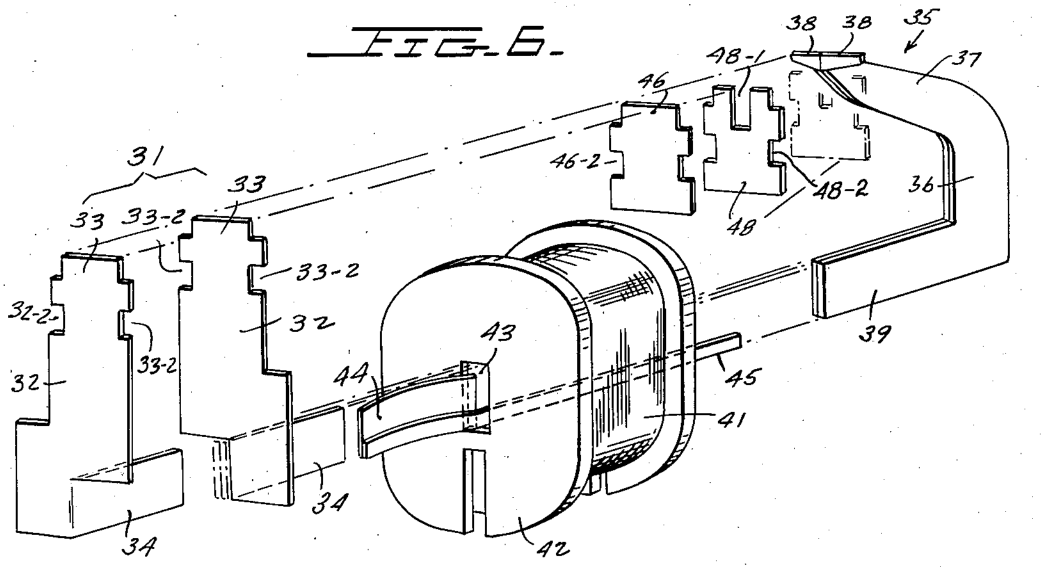
Fig. 6 is an exploded perspective view of the internal core and coil assembly of the head of Figs. 1 and 3–5, without its casing.

The transducer winding of the coil 41 is shown seated over the overlapping inner core arms 34 and 39 of the laminations 32, 36 of the complementary magnetic core sections 31, 35. The winding or coil bobbin 42 is relatively rigid or stiff, and has a central core channel 43 (Fig. 6) rectangular cross-section shaped to hold in assembled position therein the two overlapping coextensive inner core arms 39 of the core section 35 and the oppositely directed overlapping coextensive inner core arms 34 of the complementary core section 31. As indicated in Fig. 6, an arcuately bent retainer spring 44 of sheet metal may be inserted into the rectangular bobbin channel 43 over one of the overlapping outer core arms 34 of core section 31 so as to bias the overlapping core sheet arms 34, 39 of the assembled complementary core sections 31, 35 into contact engagement with each other. A grounding connector, shown as a metal strip 45, is inserted into the bobbin channel 43 and held by the metallic biasing or clamping spring 44 in contact engagement therewith so as to be electrically connected to the magnetic core sections 31, 35 and provide a grounding connection thereto.

Since the aligned laterally bent pole portions 38 of core section 35 are both formed of rolled magnetic sheet material, and the facing pole portions 36 of the complementary core section 31 are both made of rolled magnetic sheet material, the desired minute non-magnetic record-transducing gap 46 may be formed between them either by bringing them in direct contact with each other, or by pressing them against opposite sides of a non-magnetic gap-spacing layer 46 of minute thickness (Figs. 6 and 7) to provide the desired non-magnetic transducing discontinuity or gap such as .00025 to .0005 inch.

The pole end portions 38 of core section 35 are provided with a backing member 48 (Figs. 1, 4, 6, 7, 8) of strong non-magnetc sheet metal, such as Phosphor bronze. The backing sheet member 48 is provided along its upper edge region with a narrow slit 48–1 dimensioned and shaped for interfittingly receiving and holding firmly joined therein the aligned overlapping end portions of the two pole arms 37 of core section 35 just behind the aligned pole end portions 38 thereof.

As seen in Figs. 5–9, the pole end portions 33 of the core laminations 32 of core section 31, are provided with aligning recesses or notches 33–2, and the spacer shim 46 as well as the backing sheet member 48 are provided with identical aligning notches or recesses 46–2, 48–2, respectively, to assure the proper aligning of the pole end portions 33 of core section 31 with the spacer shim 46 and the backing shim 48 in their assembled position.

The several elements of the core and coil assembly of the magnetic head described above in connection with Figs. 1 and 6–10, are held fixed in properly assembled operative position with the proper gap spacing of their non-magnetic transducing gap 46, by a mounting structure or casing 50. The casing 50 is shown formed of two complementary housing or casing sections 51, 52 having interior complementary cavity spaces 51–1, 52–1 holding and enclosing the core and coil assembly of the head so that the edge regions of the pole end portions 33 and 38 bordering the non-magnetic transducing gap 40 are exposed along the exterior curved track guide surface 53 of the housing. Casing section 52 (as seen in Fig. 5) has at the region of the curved track guide surface 53 a guide wall 54 projecting therefrom and overlying and interfitting with the upper wall surface 51–2 of the complementary casing section 51. The projecting guide wall 54 of casing section 52 has formed therein an aligning opening or recess 55 of such width as to interfittingly receive and hold aligned therein in their operative position the assembled pole end laminations 33 and 38 of the two assembled core sections 31, 35, respectively, with their backing and spacer members 48, 46 as they are held in their proper gap spacing position across the transducing gap 46. The complementary casing section 51, as seen in Fig. 5 has at the region of the curved track guide surface 53, a projecting aligning nose portion 51–3 shaped to be reecived in and interfit with the guide-wall aligning recess 55 of casing section 52 so that when it is in its assembled interfitting position therewith (Fig. 1), the inner end surface 51–4 of the aligning nose 51–3 engages the flat surface of the facing pole end portions 33 of core section 31 and holds them clamped together with the underlying aligned pole end portions 38 of the complementary core section 35 in their operative position within the guide-wall aligning recess 54 of casing section 52.

The aligning guide-wall recess 55 of casing section 52 has at its deep end (as seen in Figs. 1, 5), an aligning backing surface 55–1 shaped to engage and serve as an aligning backing for the facing flat surfaces of the aligned pole end portions 38 of core section 35, and the assembled superposed pole end portions 33 of the complementary core section 31. The side surfaces of the aligning recess 55 of casing section 52 are provided with aligning elements or projections 55–2 shaped to engage and align the aligned aligning recesses 33–2, 48–2 and 46–2 of the assembled pole end portions 33, 38 of the two core sections 31, 35, respectively, and their backing shim 48 and spacer shim 46, when the two wall sections 51, 52 are joined or clamped to each other in their assembled condition, seen in Figs. 1 and 4. With this arrangement, after the core sections 31, 35 are assembled with the coil bobbin 42 into the final core and coil assembly, as seen in Figs. 7–10, this core assembly is placed with its aligned flat pole end portions 33, 38 and its backing shim 48 within the guide wall aligning recess 55 of guide wall section 52 so that the aligning projections 55–2 thereof enter aligning engagement with the aligning recesses 33–2, 48–2 and 46–2 of the assembled opposing pole end portions 33, 38 and their backing sheet member 48 and spacer shim 46 for holding them in their proper aligned position within the assembled casing 50 with the edge region of the pole portions 33, 38 exposed along the curved guide track surface 53.

The guide-wall-recess aligning backing surface 55–1 is provided with a narrow inward recess 55–3 shaped for holding interfitted therein the rearward regions of the upper pole arm laminations 37 of core section 35 in the region where they adjoin the pole end portions 38 thereof, when the core assembly is placed in its aligned position within the aligning guide-wall recess 55 and the cavity space 52–1 of casing section 52. The narrow guide wall recess 55–3 is adjoined by a wider recess 55–4 formed in the lower part of the inwardly facing casing wall 52 for receiving therein the more inward parts 37, 36 of core section 35 when the core and coil assembly is assembled with their pole end portions 33, 38 aligned within the aligning recess 55 of casing section 52, in the manner described above.

After so assembling the core and coil assembly described above in connection with Figs. 6–10 in the cavity 50–1 of casing section 52, the complementary casing section 51 is assembled thereover along the interfitting casing surfaces, in the way indicated in Figs. 1, 4 and 5, with the clamping nose projection 51–2 fitting in the aligning recess 55 of the guide wall 54. Thereupon the two assembled casing sections 51, 52 are secured to each other as by screws 57 and clamping nuts 57–1. The interior cavity spaces 51–1, 52–1 of the two casing sections 51, 52 may be filled with an inert resin material which solidifies upon setting and binds and rigidifies all elements of the core and coil assembly and the casing sections 51, 52 in their desired operative position within the interior of the casing 50. Good results are obtained by filling the cavity spaces 51–1, 52–1 of the casing sections 51, 52, in which the core and coil assembly is so positioned, with known epoxy resin ingredients, before securing the two facing sections to each other with the clamping means such as the screws 57, so that after the epoxy resin becomes set, the core and coil assembly shown in Figs. 6–10 is held interlocked and rigidified with the assembled casing sections 51, 52.

After so completing the assembly of core and coil structure with its casing 50, the region of the guide surface 53 thereof along which the gap region of the pole tips 33, 38 is exposed, has formed therein, as by milling or other machining operations, two grooves 53–4 which fix the width of the exposed pole tips 33, 38 and thereby define and fix the width of the magnetic record track made by the head during a recording operation.

One phase of the invention is the discovery that if a closed magnetic core loop of a magnetic record transducing head has a transducing coil 41 with enough turns of coil wire to fill a given coil space, and such coil is replaced with a coil having the same number of turns of finer wire occupying at most ⅔ of the space of the coil wound with the coarser wire, with the outer coil turns of the coil formed with thinner or finer wire being at least ⅓ closer to the surrounded magnetic core than the outer turns of the coil wound with the coarser wire, the high-frequency response of a magnetic head formed with such finer wound coil, is materially improved. For instance, if a coil, such as coil 41, formed with No. 42 wire, is replaced by a coil having finer No. 48 wire, with both coils having the same number of coil turns, a magnetic head having the coil formed with the finer wire turns has at 10,000 c.p.s. (cycles per second), an output 10 to 15 db higher than the output of the same head having a coil made with the coarser wire. In other words, the shape and the volume of the coil turns of a magnetic transducing head has a material effect on the high-frequency response of the over-all recording and play-back process of the head.

The magnetic head of Figs. 1–5 may also be provided with external terminal members 65 for connecting the terminals of coil winding 41 to an external circuit. The terminal members 65 may be formed of relatively stiff strips of suitable metal such as brass, having their inner ends connected to the coil winding 41.

By way of example, and without thereby limiting the scope of the invention, there are now given specific structural details of a magnetic record transducing head of the type described above, which has been found to be highly effective in practice. The two core sections 31, 35 consisted of "High Mu 80" magnetic sheet material, .010 inch thick. The height of the sheet portion 32 of core section 31, as seen in Figs. 6–9, was .440 inch, and its maximum width was .125 inch; its inner sheet arm 34 was .230 inch long, and its width was .090 inch. The aligning recess 33–2 of pole portion 33 had a depth of 0.225 inch, and a height of .047 inch. The complementary core section 35 had a height of .440 inch, from the upper edge of its pole pieces 38 to the bottom edge of its inner core arm 39. The total length of the inner arm 39 was .300 inch, from its end edge which is inserted into the coil bobbin to the opposite end edge of the core lamination; the maximum height of its laterially bent pole end portion 38 was .042 inch. The sheet metal of backing shim 48 was of brass .010 inch thick. The spacer washer 46 was of aluminum foil .0005 inch thick. The casing, as seen in Fig. 1, had a height of .846 inch, a width of .545 inch, and its lateral dimension, as seen in Fig. 3, was .703 inch.

In a magnetic recording transducing head of the type described in connection with Figs. 1–10, and in general with any type of magnetic recording transducing head, it is important to suppress interlinkage of the transducing windings and of the core of the head with stray magnetic fluxes which tend to induce in the coil windings objectionable noise or other disturbing hum signals. By providing the recording head of the type shown in Figs. 1–10 with coil windings arranged on a part of the substantially closed magnetic core loop 30 which is remote from the pole gap region 46 thereof, with the axis of the coil windings 41 extending in a direction other than transverse to the direction of the relative movement of the record track 40–1 at the region at which it engages the pole gap 46, the effect of stray flux is materially reduced.

In order to secure efficient magnetic record transducing operations at higher frequencies, such as above 6000 cycles per second, with a magnetic head operating with a single coil winding, and having a looped core with the cross-sectional area of the core at most .010 square inch surrounded by the coil winding, the average outer width of the coil winding should at most correspond to the width of a circular area of three times the average width of the core area, and preferably at most only twice the average width of the core area.

In accordance with the invention, a magnetic record transducing head having a loop-like closed magnetic circuit formed of two complementary core sections which differ from each other in their structure and in their magnetic reluctance, and could not be used to form with their associated windings an electro-magnetically balanced hum-bucking transducer head, is nevertheless designed to operate with a hum-bucking effectiveness approaching that of heretofore known structurally, magnetically and electrically symmetric and balanced magnetic transducer heads. In accordance with the invention, this is acomplished as follows:

The loop-like core section of the magnetic transducer head, which is formed of two structurally and magnetically different complementary core sections, each having different magnetic reluctance than the other has, in addition to its main non-magnetic transducing gap along which its windings are magnetically interlinked with the relatively moving record track, another non-magnetic gap of a magnetic reluctance matching or balancing the magnetic reluctance of the main non-magnetic transducing gap. In addition, the structurally and magnetically different two core sections of the head, which have different magnetic reluctance and which are so separated by the two non-magnetic gaps, are provided with two unlike coil winding sections, with the core section having lower magnetic reluctance having a winding section with a sufficiently smaller number of coil turns, and the core section having larger magnetic reluctance having a winding section with a sufficiently larger number of coil turns so that the unequal effectiveness of the respective two core sections shall balance the differences of their respective magnetic reluctance, for causing disturbing magnetic stray fields traversing the two core sections and/or winding sections in any direction to induce in the interconnected winding sections of the two core sections voltages which are equal and opposite in phase, and which cancel each other, although the interconnected coil windings are relatively efficient in magnetically recording or reproducing signals by magnetic linkage between the windings and a record track moving relatively to the transducing pole gap of such head.

Thus, by way of example, a magnetic transducer head having the loop-like core structure of the type described in connection with Figs. 1–10, and having two structurally and magnetically different core sections 31, 35, may be modified in accordance with the invention into a hum-bucking head, in the manner described in connection with Fig. 7–A. The head of Fig. 7–A has a core structure formed of the same elements as the core structure of Figs. 1–10. It is, however, modified as follows:

Along the surface regions where the laminations of the two inner core arms 39 of the C-shaped core section 35 are engaged by the overlapping laminations of the inner core arms 34 of the L-shaped core section 31, are placed non-magnetic spacer layers or shims, of aluminum foil, for instance, so that there is formed between the overlapping core arms 34, 39 a balanced non-magnetic discontinuity or gap balancing substantially the non-magnetic discontinuity of the main non-magnetic transducing gap 46 between the outer pole portions 33 and 38 of the two core sections 31, 35. In addition, the intermediate arm portions of the C-shaped core section 35 and the L-shaped core section 31 are each provided with surrounding coil winding sections 61, 62, respectively. The coil winding 61 of core section 31 has a sufficiently different number of coil turns than the coil winding 62 of core section 35 so as to balance the differences of the magnetic reluctance of the respective core sections with respect to their two magnetically balanced and generally opposite non-magnetic gaps. Thus, core section 31, which has a relatively smaller magnetic reluctance, is provided with a coil 61 having a sufficiently smaller number of coil turns than coil 62 surrounding the other core section 35, which has a relatively larger magnetic reluctance, so that the smaller number of turns of winding 61 in conjunction with the smaller magnetic reluctance of core section 31, balances electrically and magnetically the combination of the larger magnetic reluctance and larger number of coil turns of core section 35 with its coil 62, with respect to the two relatively opposite, balanced non-magnetic gaps, so that any stray fields interlinked with the core and/or windings 61, 62, will induce in the two coil windings 61, 62, voltages which are substantially equal and opposite in phase, and cancel each other. The overlapping inner core arm portions 39, 34 of the two core sections may be retained in their assembled position by a non-magnetic channel formation 63, corresponding to the channel 43 of the coil bobbin 42 of the head of Figs. 1–10. Alternatively, the channel 63 may also be provided with some of the coil turns forming the coil winding 62 of core section 35 for securing the desired balance between the two structurally and magnetically different core sections 31, 35, and their balancing correspondingly different coil windings 61, 62. Otherwise, the head of Fig. 7–A may be of the same construction as the head of Figs. 1–10.

The principles underlying the balanced hum-bucking magnetic heads of the type described above in connection with Fig. 7–A, are also applicable to other types of magnetic heads having a substantially closed loop-like magnetic core of magnetizable sheet material having two pole tip sheet portions with parallel overlapping sheet surfaces held across a minute non-magnetic discontinuity or transducing gap of a predetermined width for recording or reproducing magnetic signals by magnetic linkage of a width of a relatively moving elongated magnetic record track engaging the pole tip edges of the transducing gap with transducing windings surrounding the closed magnetic core.

Fig. 7–B shows another exemplification of such hum-bucking head of the invention. It comprises a magnetically substantially closed loop-like core structure having two structurally alike complementary core sections 92, 93, and two interconnected transducing winding sections 94, 95 surrounding the two core sections, as in Fig. 7–B. Each of the core sections 92, 93 is formed of one or more generally C-shaped overlapping coextensive sheet portions of low-retentivity magnetizable sheet material with all surfaces of their magnetic sheet portions extending parallel to each other. On the side facing the width of the record track, which is assumed to move in a direction perpendicular to the plane of the drawing surface, the two core sections 92, 93 have parallel complementary overlapping pole tip sheet surface portions 92–1, 93–1, which are held spaced from each other across a minute non-magnetic transducing gap, as in the head with the transducing gap 46 of Figs. 1–10 described above, for interlinking successive elements of the record track bridging the facing pole tip edges of pole tips 92–1, 93–1 with the interconnected transducing windings 94, 95. The magnetic sheets of the two core sections 92, 93 have at their opposite ends 92–4, 93–4, parallel overlapping sheet surfaces which are held spaced from each other across a second, complementary non-magnetic gap, the width of which, like that of the transducing gap between pole tip ends 92–1, 93–1, is determined by the thickness of a shim of non-magnetic material, such as a spacer of aluminum foil placed between them.

The manufacture of magnetic heads out of low-retentivity high-permeability magnetic sheet material so that all heads have substantially the same frequency response characteristics, presents critical problems. To minimize these problems, the complementary core sections 92, 93 of a head of the type shown in Fig. 7–B, are designed so that the overlapping area across the non-magnetic gap between the parallel sheet surfaces of their core ends 92–4, 93–4, is materially greater than and at least twice as great as the overlapping parallel sheet surfaces across the non-magnetic transducing gap between the pole tips 92–1, 93–1.

In accordance with the invention, notwithstanding the larger overlapping gap area of the core sheet ends 92–4, 93–4, the reluctance of their non-magnetic gap spacing is balanced so that it has substantially the same reluctance as the non-magnetic transducing gap between core sheet pole-tip ends 92–1, 93–1, by forming the gap between core ends 92–4, 93–4 with a non-magnetic spacer shim of greater thickness, so that both complementary non-magnetic gaps of the closed core structure have substantially the same magnetic reluctance or the same order of magnetic reluctance.

In addition, the windings 94, 95 are provided with such equal or balanced number of coil turns so that each core section 92, 93 is electrically and magnetically balanced with respect to the non-magnetic transducing gap between pole tip ends 92–1, 93–1, and the opposite non-magnetic gap between the core ends 92–4, 93–4, so that disturbing magnetic stray fields interlinked with the core sections 92, 93 and windings 94, 95 in any direction, induce in the two interconnected windings 94, 95, equal voltages of opposite phase which cancel each other while reproducing efficiently magnetic signals of successive elements of a record track bridging the pole tip edges of the pole tips 92–1, 93–1 of the non-magnetic transducing gap thereof.

The core and coil assembly of a transducer head described above in connection with Figs. 1–10, may also be used as an erasing head. A combination of such erasing head and record transducing head, may be assembled in a single casing, for instance in the manner indicated in Fig. 2. The combination of erasing and recording head of Fig. 2 has its two core and coil assemblies mounted between two complementary casing wall sections of a casing 50–1. The casing 50–1 has a wall section 51–8 similar to the casing wall section 51 of Fig. 1, and a complementary casing wall section similar to casing wall section 52 of Fig. 1, except that their inwardly facing wall sections have formed therein two mounting cavities 51–1 and 52–1, respectively, corresponding to the cavities of casing 50 of Fig. 1, one cavity for each of the two core and coil assemblies of the erasing and transducing head, respectively. The similarly constructed core and coil assemblies of the erasing head and the transducer head are held assembled in the casing 50–1 so that the non-magnetic gap 46–8 of the erasing head and the non-magnetic gap 46 of the transducing head are exposed along successive portions of the track guide surface 53–8 so that when a magnetic record track, indicated by dash-double-dot line 40–9, is guided thereover during a recording operation, each portion of the track first passes the gap 46–8 of the erasing head for erasing all previous records thereof, before it comes into transducing engagement with the non-magnetic gap 46 of the transducing head for magnetically recording other signals. The core and coil assembly of the erasing head differs from the core and coil assembly of the similar record transducer head only by providing its non-magnetic gap 46–8 with a larger non-magnetic gap spacing, such as about 0.005 inch.

The features and principles underlying the invention described above in connection with specific exemplifications thereof, will suggest to those skilled in the art many other modifications thereof. It is accordingly desired that the appended claims be construed broadly and that they shall not be limited to the specific details shown and described in connection with exemplifications thereof.

We claim:

1. In a magnetic transducing head for transducing magnetic record signals with a relatively flat magnetic record track by relative motion between the head and the flat record track in a predetermined track direction; said head having only a single magnetic core loop with only two core pole ends forming only a single transducing gap through which the field of said core loop is interlinked with successive portions of said track moving past said gap; transducer windings surrounding a portion of said core loop; said core loop being formed of two complementary opposite core bodies which are formed only of magnetic sheet members; two sheet members of said two core bodies, respectively, having each a relatively flat mutually overlapping pole sheet end bordering said transducing gap and extending in a direction transverse to said track direction, at least one of said sheet members having a sheet section extending in a direction generally parallel to the direction of said track direction, all of said transducing windings surrounding only sheet portions of said core loop extending generally parallel to said track direction.

2. In a magnetic transducing head as claimed in claim 1, substantially the entire length of all sheet surfaces of one of said complementary core bodies extending from the end of said windings towards said transducing gap extending transversely to said track direction.

3. In a magnetic transducing head as claimed in claim 2, each of said sheet members having a sheet portion extending in a direction parallel to the direction of said track direction.

4. In a magnetic transducing head as claimed in claim 1, at least one of said two core bodies being formed of two complementary sheet members, said two complementary sheet members having sheet sections overlapping and engaging each other along said overlapping surfaces and extending in a direction generally parallel to said track direction, at least portions of said overlapping sheet sections being surrounded by said windings.

5. In a magnetic transducing head as claimed in claim 4, other portions of said two complementary sheet members having pole sheet ends bordering said transducing gap and aligned with each other in a plane extending transversely to said track direction.

References Cited in the file of this patent

UNITED STATES PATENTS

| | | |
|---|---|---|
| 1,585,158 | Livingston | May 18, 1926 |
| 2,089,287 | Molloy | Aug. 10, 1937 |
| 2,650,952 | Bauer et al. | Sept. 1, 1953 |
| 2,700,073 | Kleis et al. | Jan. 18, 1955 |
| 2,763,729 | Camras | Sept. 18, 1956 |
| 2,803,708 | Camras | Aug. 20, 1957 |

FOREIGN PATENTS

| | | |
|---|---|---|
| 877,212 | Germany | May 21, 1953 |